United States Patent
Itzkowitz

(10) Patent No.: US 7,303,341 B2
(45) Date of Patent: Dec. 4, 2007

(54) STABLE PLATFORM FOR IMAGE CAPTURING

(76) Inventor: Arnold Itzkowitz, 214 Kinnelon Rd., Kinnelon, NJ (US) 07405

( * ) Notice: Subject to any disclaimer, the term of this patent is extended or adjusted under 35 U.S.C. 154(b) by 0 days.

(21) Appl. No.: 11/473,073

(22) Filed: Jun. 23, 2006

(65) Prior Publication Data

US 2006/0239678 A1 Oct. 26, 2006

Related U.S. Application Data

(63) Continuation-in-part of application No. 10/902,946, filed on Aug. 2, 2004, now Pat. No. 7,068,927.

(60) Provisional application No. 60/750,353, filed on Dec. 15, 2005.

(51) Int. Cl.
*G03B 17/00* (2006.01)
(52) U.S. Cl. ......................... 396/421; 396/428
(58) Field of Classification Search ................ 396/419, 396/421, 7, 428, 12–13
See application file for complete search history.

(56) References Cited

U.S. PATENT DOCUMENTS

| 894,348 | A | 7/1908 | Seele |
|---|---|---|---|
| 1,211,527 | A | 1/1917 | Berndt |
| 1,525,877 | A | 2/1925 | Miller |
| 1,867,763 | A | 7/1932 | Rose |
| 3,467,350 | A | 9/1969 | Tyler |
| 3,485,151 | A | 12/1969 | Taylor |
| 3,925,794 | A | 12/1975 | Alouges |
| 4,017,168 | A | 4/1977 | Brown |
| 4,044,364 | A | 8/1977 | Prinzo |
| 4,392,183 | A * | 7/1983 | Ostlund et al. ............. 362/11 |
| 4,645,320 | A | 2/1987 | Muelling et al. |
| 5,034,759 | A | 7/1991 | Watson |
| 5,113,768 | A | 5/1992 | Brown |
| 5,173,725 | A | 12/1992 | Giles et al. |
| 5,184,521 | A | 2/1993 | Tyler |
| 5,222,826 | A | 6/1993 | Hanke |
| 5,538,212 | A | 7/1996 | Kennedy |
| 5,568,189 | A | 10/1996 | Kneller |
| 5,710,945 | A | 1/1998 | Thompson |
| 5,721,997 | A | 2/1998 | Powell et al. |
| 5,752,112 | A | 5/1998 | Paddock et al. |
| 5,790,910 | A | 8/1998 | Haskin |
| 5,897,223 | A | 4/1999 | Tritchew et al. |

(Continued)

OTHER PUBLICATIONS

Itzkowitz, Arnold, Gyro Stabilized Video & Film Platform, Web page screen shot (http://aerialexposures.com/gyroplatform.htm), Sep. 2, 2003, Aerial Exposures.com, LLC, Kinnelon, New Jersey, USA.

(Continued)

*Primary Examiner*—Christopher Mahoney

(57) ABSTRACT

A ball and race universal joint has an equipment mounting plate attached to and positioned above the race. The ball has a horizontal shaft extending there through with ends protruding from opposite sides of the ball. One or more elastic cords are connected to the protruding ends of the shaft. The elastic cords permit the apparatus to be attached between two mounting points located in or on a moving and/or vibrating platform at a level close to that of the mounting points and provide vibration isolation from the platform. The universal joint permits a camera or other equipment mounted on the mounting plate to be aimed in any direction. A base has a turntable with a pair of spaced uprights which may be used to provide the mounting points if such are not conveniently available in or on the platform.

19 Claims, 12 Drawing Sheets

U.S. PATENT DOCUMENTS

| | | | | |
|---|---|---|---|---|
| 5,993,077 | A * | 11/1999 | Jones | 396/428 |
| 6,056,449 | A | 5/2000 | Hart | |
| 6,356,308 | B1 | 3/2002 | Hovanky | |
| 6,579,016 | B2 | 6/2003 | Chapman | |
| 6,611,662 | B1 | 8/2003 | Grober | |
| 6,939,061 | B2 | 9/2005 | Sawada | |
| 6,988,846 | B2 | 1/2006 | Vogt | |
| 7,090,416 | B2 * | 8/2006 | Mootz et al. | 396/421 |
| 2004/0208499 | A1 * | 10/2004 | Grober | 396/428 |

OTHER PUBLICATIONS

Glidecam Industries, Inc., Glidecam V-16 and V-20, Web page screen shot (glidecam.com/product-v-16-pro.php), taken Jul. 27, 2005 Glidecam Industries, Inc. Plymouth, MA.

Glidecam Industries, Inc., Glidecam 2000 PRO, Web page screen shot (glidecam.com/product-2000-pro.php), taken Jul. 27, 2005, Glidecam Industries, Inc., Plymouth, MA.

Glidecam Industries, Inc., Glidecam Custon Gyro Stabalizer, Web page screen shot (glidecam.com/product-gyro-ks-4.php), taken Jul. 27, 2005, Glidecam Industries, Inc, Pltmouth, MA.

Glidecam Industries, Inc., Glidecam Vista Head, Web page screen shot (glidecam.com/product-vista-head.php), taken Jul. 27, 2005, Glidecam Industries, Inc., Plymouth, MA.

Aerialcinematography.com, Tyler Three Axis Mount, Web page screen shot (http://www.aerialcinematography.com/air/mnts_tylr_3axs.html), taken Oct. 23, 2005, AerialCinematography.com, Singapore.

* cited by examiner

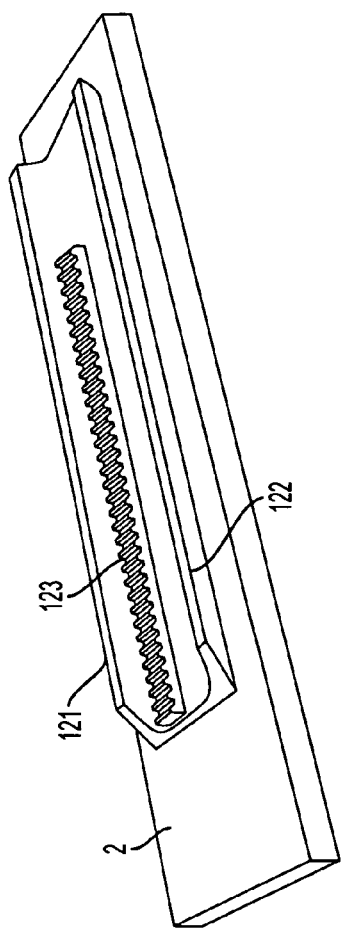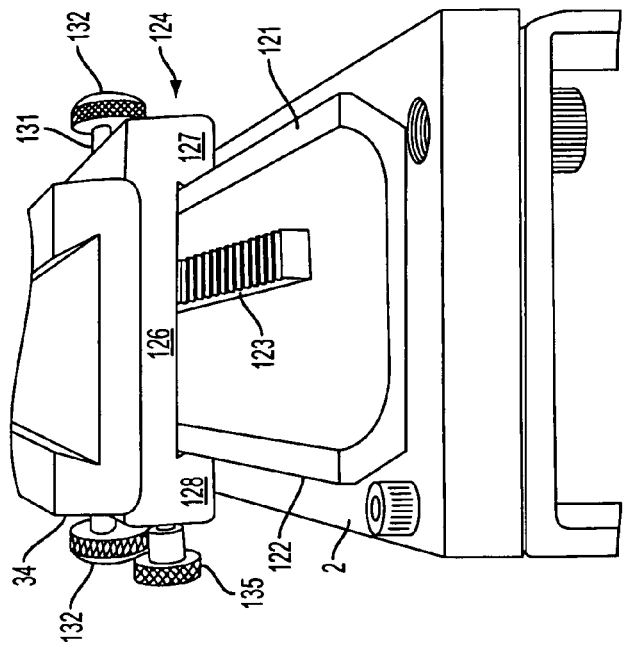

STABLE PLATFORM FOR IMAGE CAPTURING

CROSS REFERENCE TO RELATED APPLICATIONS

This application is a continuation-in-part of applicant's U.S. patent application Ser. No. 10/902,946, filed Aug. 2, 2004 now U.S. Pat. No. 7,068,927 to Frame Assembly For Supporting A Camera, published on Feb. 10, 2005 as Publication Number U.S. 20050031335 Al, the content of which is herein incorporated by reference. This application claims the benefit of the filing date of Provisional Application Ser. No. 60/750,353, filed Dec. 15, 2005 to Stable Platform For Image Capturing, the content of which is herein incorporated by reference.

BACKGROUND OF THE INVENTION

1. Field of the Invention

The present invention relates to apparatus to facilitate capturing stable images from a moving and/or vibrating platform in an effective, facile and economical manner. It includes a support assembly for mounting an image capturing device such as a still camera, or more particularly, a digital, video or film motion picture camera, a means for permitting the camera to remain properly aimed at the image being captured regardless of changes in orientation of the moving platform and means for mounting the support assembly with respect to a moving platform for isolating the image capturing device from vibratory and bodily motions of the moving platform. More particularly, the present invention relates to an apparatus for stably supporting a video camera in or on a moving platform, such as a person or vehicle, to allow the steady recording of objects or scenes with respect to which the platform may be moving. The apparatus of the present invention is suited for recording from a wide variety of moving platforms, by way of example and not limitation, aircraft, water craft and ground craft such as airplanes, helicopters, hang gliders, balloons, boats, submarines, trains, cars, trucks, bicycles, motorcycles, scooters, surf boards, elevators, animals and people.

2. Description of the Related Art

It has heretofore been difficult to capture stable images using and motion picture cameras. Certain uses of these cameras render stable image capturing have been particularly difficult such as recording or filming from moving platforms.

Many modern video and still cameras have built in electronic or optical stabilizers. These stabilizers are helpful when the camera is held relatively still, to capture, for example, a distant landscape. However, when camera movement is made that exceeds the ability of the built in stabilizer to correct, the result is a jumping effect as the stabilizer attempts to reestablish a reference. This problem is seen particularly often when shooting from platforms which may be moving and changing direction and orientation rapidly and/or unpredictably. Even though the jumping effect is less pronounced when using optical stabilizers as compared to electronic stabilizers, neither stabilizer provides sufficient stability without major additional physical stabilization.

Many products are currently marketed to provide external stabilization for camera operators. The most common devices are tripods. Tripods offer stability, but even with high cost fluid heads tripods are ineffectual when shooting from rapidly and/or unpredictably moving platforms because they transmit the motion and/or vibration of the platform to the camera. The legs of the tripod are also an impediment to the freedom of motion of the camera operator.

Gyroscopically stabilized platforms are available, but these are extremely expensive, heavy, and require considerable power. Typically they are mounted outside the platform in or on which the operator is located. When mounted exteriorly of aircraft special certification is required from the Federal Aviation Administration.

One device, presently sold by Glidecam Industries of Plymouth, Mass. whose web address is http://www.glidecam.com, the Glidecam 2000 Pro™, uses a system of weights and balances to stabilize a handheld video camera. However, use of this device requires the camera operator to hand hold all the weight of the apparatus and camera in front of himself, and thus causes significant fatigue in the operator. In addition, the camera operator cannot use the camera's view finder, but must look directly at the object. This apparatus is limited to use with cameras weighing only up to six pounds. A accessory for use with this product, the Glidecam Body-Pod™ provides a post that nests in a pocket on a camera operator's belt. This belt assembly could support a considerable amount of weight, and might otherwise be useful, but still does not provide sufficient stability for all uses and requires that the operator's hands be on the camera at all times. Other models have increased weight carrying capacity but suffer from the same drawbacks. Their most sophisticated frame assembly, the Glidecam V-20 and its associated accessories per ports to allow you to "shoot from moving vehicles and travel over uneven terrain without camera instability or shake" but lacks gyroscopic stabilization and is extremely expensive.

Another device, The Pro Camcorder Shoulder Rest, is sold by Video Innovators, of Frisco, Colo. whose web address is http://www.videoinnovators.com. This device is a hand-held mounting bar on which a camera is mounted. At the end of the device in front of the camera operator is a handle pointing downward, which the camera operator grips to stabilize the camera and support most of its weight. At the shoulder, the rest is curved and padded in order to rest comfortably on the camera operator's shoulder. In spite of claims to the contrary, when a camera is mounted on one of the rests, it is not positioned so that the camera operator can comfortably look into the viewfinder. While shifting some of the camera's weight to the operator's shoulder may be of assistance, the entire unit is unstable to tilting, i.e., the camera can be easily tilted causing extreme instability in the resulting video footage. Their The Vehicle Camera Dash Mount is inexpensive and they do aver that it "makes taking your pictures with your camcorder (sic) smooth and easy while traveling at highway speeds," but does not appear to have any mechanism to isolate vibration or compensate for rapid and/or extreme shifts in position or orientation of the car, and appears to work only in cars and only if they have a windshield.

A portable camera assembly having a shoulder rest, a hand grip and a camera mount is also disclosed in U.S. Pat. No. 4,963,904 to Lee. A gun stock camera rest, is disclosed in U.S. Pat. No. 2,806,416 to Jones. A support for photographic cameras with shoulder straps, a belt and various support and cross bars is disclosed in U.S. Pat. No. 2,552,205 to Moss. However, these devices all have the disadvantages of the Camcorder Shoulder Rest, discussed above.

Monopods have also been used in the past, and can provide some stability when grasped about 12" below the body of the camera. One such monopod is disclosed in the Jones patent, cited above. Nonetheless, the stability obtained with monopods is still not acceptable.

Various types of shoulder harnesses for supporting cameras have been proposed in the prior art, but none provide a Stable, inexpensive and versatile solution to supporting a portable video camera. For example, U.S. Pat. No. 2,746,369 to Beard et al., discloses a shoulder camera mount with pistol grips for supporting telephoto and long focus lenses. The patent discloses, for example, that the weight of the "camera gun" is so distributed that the center of gravity thereof at elevated positions is substantially disposed to fall along a line through the shoulders and torso of the operator. However, it is clear that at normal elevations, or at angles below the horizontal, a great deal of the weight of a telephoto lens for example, would be placed in the hands of a user, causing eventual fatigue. No means for adjusting the center of gravity of the assembly, for example, is provided.

A camera support is disclosed in U.S. Pat. No. 3,332,593 to Fauser, in which "body-engaging tubular members" and "body-engaging" rollers attach the support to the body. Similar shoulder harness supports are disclosed in U.S. Pat. No. 5,073,788 to Lingwall, U.S. Pat. No. 4,526,308 to Dovey, U.S. Pat. No. 2,873,645 to Horton, and U.S. Pat. No. 2,636,822 to Anderson. These devices have, among others, the disadvantage of being unable to move independently of the body of the operator.

U.S. Pat. No. 2,945,428 to Dearborn discloses a camera stabilizer with a tubular frame, a camera mounting portion and balancing masses disposed on opposite sides of the apparatus. However, the frame is specifically intended not to be rested on the shoulders of the operator. The entire weight is supported by the users arms, or, in other disclosed embodiments, a combination of the users arms and a monopod or belt harness, so that use of this device would lead to unnecessary fatigue.

U.S. Pat. No. 6,056,449 to Hart discloses a camera stabilizer with a frame which rests on the shoulders of an operator, in which the camera is mounted on a portion the frame in front of the operator and a counterweight, which may also be a gyroscope mechanism (gyro), is mounted to the frame behind the operator. This arrangement is not suitable, and may even be dangerous, when the operator is located in or on a moving platform or in a crowd. The necessarily large front to rear dimensions of the frame render it unsuitable for use within the confines of a small airplane or helicopter, passenger automobile and the like. The addition of the weight of the apparatus on the upper torso of the operator, especially when combined with the effects of the gyro can easily cause the operator to loose his/her balance when standing in or on most movable platforms such as airplanes, helicopters and boats which are subject to rapid and large shifts of position and orientation. The relatively long extension of the frame behind the operator and out of his field of view can cause it to strike bystanders as the operator moves about.

Tyler Camera Systems of Van Nuys, Calif. whose web address is www.tylermount.com, offers a number of camera mount systems that provide excellent stability when used in helicopters and other vehicles. Their systems are mostly rented, must be insured for hundreds of thousands of dollars and are economically out of the range of most photographers. Their Middle Mount II and Major mount systems are counterbalanced boom type assemblies pivoted to upright supports mounted on bases. Some models have optional "gyro assist." Their nose mount and ball mount systems are externally mounted to the helicopter and differ substantially from the present invention.

The Tyler Three Axis Mount is a gyro stabilized camera mount bearing a superficial similarity to the present apparatus but possesses serious disadvantages when compared to the present apparatus. The Three Axis Mount at a minimum uses a totally different mechanical arrangement of parts to achieve the three axis motion, is not vibration isolated and requires spring and shock cord dampening of pan/tilt resistance, apparently due to the unbalanced weight distribution caused by mounting the gyros above the camera.

The Aerial Exposures Gyro Stabilized Video and Film Platform is an embodiment of applicant's pending U.S. patent application Ser. No. 10/902,946, published on Feb. 10, 2005 as Publication Number U.S. 20050031335 A1. It possesses many of the advantages of the present apparatus but differs in many of its structural characteristics. One problem with the Aerial Exposures Gyro Stabilized Video and Film Platform is overcome by the current invention. Because the camera mounting plate, camera gyros and other equipment are all suspended beneath the upper attachment point of the suspension means the center of mass of the Aerial Exposures device is well below that upper attachment point. This can create a pendulum effect whereby the apparatus swings back and forth under certain conditions. Acceleration or deceleration of the helicopter while shooting video sideways from the helicopter can cause the image to tilt slightly. If the image includes the horizon or other full frame line the effect is fairly noticeable. If the camera operator is holding the apparatus (for example, while aiming the camera) the pendulum effect is exacerbated.

BRIEF SUMMARY OF THE INVENTION

The invention is a support assembly having an equipment mounting element on which can be mounted a video, film or still camera and/or associated accessories, or any other device where the advantages of stability and the ability to maintain aim while being used in a moving platform is desired. The support assembly further includes a shaft and ball joint assembly to which the equipment mounting element is mounted for movement about any axis so the device mounted on the plate may tilt in any direction. Gyroscopic stabilizers (gyros) can be mounted to the underside of the plate to stabilize the plate against pitch, roll and yaw. Means is provided to suspended the support assembly in such a way as to permit the support assembly to move relatively freely in any direction with respect to the platform on or in which it is used and to isolate it from vibrations present in such platform. The means to suspend includes a pair of resilient cords attached at one end to each end of the shaft and at their other ends for attachment to a pair of preexisting hooks or other suspension points on the moving platform. When the platform does not have suitable preexisting suspension points the means to suspend the frame may itself include a stand having a base and one or more uprights provided with means to which the resilient cords may be attached, which stand may be positioned in or on the platform. The uprights may be attached directly to the base of the stand but preferably are attached to a turntable rotatably mounted to the base so the entire assembly may be rotated about a vertical axis. The length of the cords is such that the shaft and ball joint are supported at a level in close proximity to the level of the mounting points. This also tends to place the center of mass of the suspended elements close to the level of the mounting points.

It is therefore an object of the present invention to provide a support assembly for supporting a camera which when used with gyroscopic stabilizers provides stability approaching that of the most expensive commercial systems while providing increased versatility at a cost closer to the simplest hand held and body mounted systems.

It is another object of the present invention to provide a support assembly which is inexpensive, relatively light and compact, easy to use especially in confined spaces and safe for the operator and bystanders.

It is a further object of the present invention to provide a support assembly for a video camera which is extremely stable and maneuverable, and which does not cause fatigue in the operator.

Another object of the present invention is to provide a support assembly for mounting a video or other type of camera which is safe for use in or on a wide variety of moving platforms subject to rapid and/or extreme shifts in position or orientation.

Another object of the present invention is to provide a support assembly for mounting a video and other types of camera which will isolate the camera from vibrations in the platform in or on which it is used.

It is therefore an object of the present invention to provide a support assembly with a stand which provides stability approaching that of the most expensive commercial systems while providing increased versatility at a cost closer to the simplest hand held and body mounted systems It is another object of the present invention to provide a support assembly which is inexpensive, easy to use especially in confined spaces and safe for the operator and bystanders when used properly.

Another object of the present invention is to provide a support assembly with a stand which on a suitable surface of a wide variety of moving platforms subject to shifts in position or on.

Another object of the present invention is to provide a support assembly with a stand which hipped, transported and stored in a compact, space saving configuration.

BRIEF DESCRIPTION OF THE SEVERAL VIEWS OF THE DRAWINGS

FIG. 25 is a perspective view of a modified mounting plate.

FIG. 26 is an inverted perspective view of a bridge plate.

FIG. 27 is a perspective view of the bridge plate mounted on the modified mounting plate.

DETAILED DESCRIPTION OF THE PREFERRED EMBODIMENTS

Figure 1:
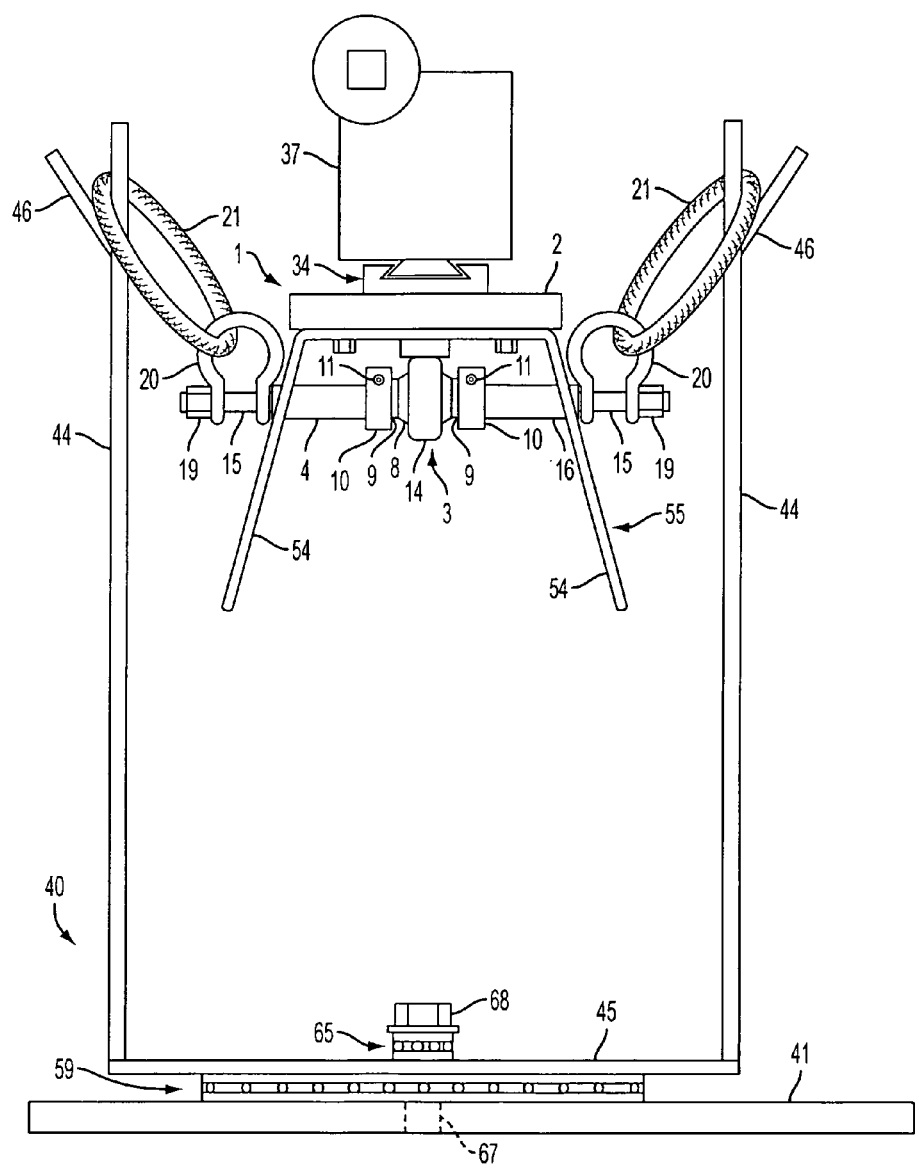
FIG. 1 shows a rear view of the platform assembly with gyroscopic stabilizers and their brackets removed for clarity.
Figure 2:
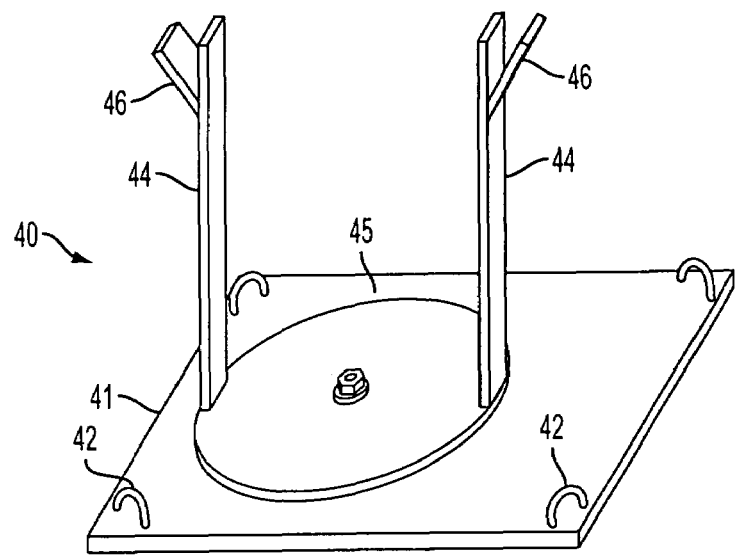
FIG. 2 shows an oblique view of the base assembly.
Figure 3:
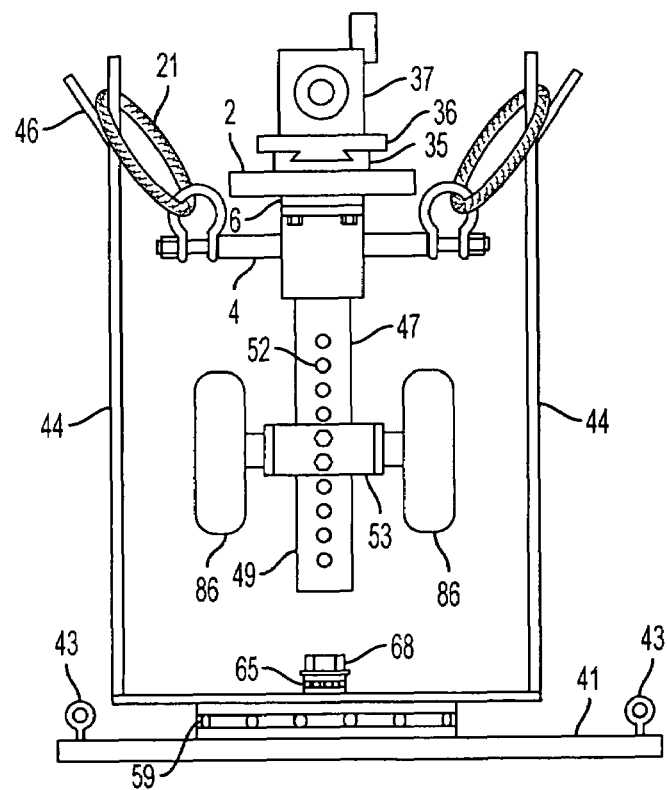
FIG. 3 shows a front view of the platform assembly.
Figure 12:
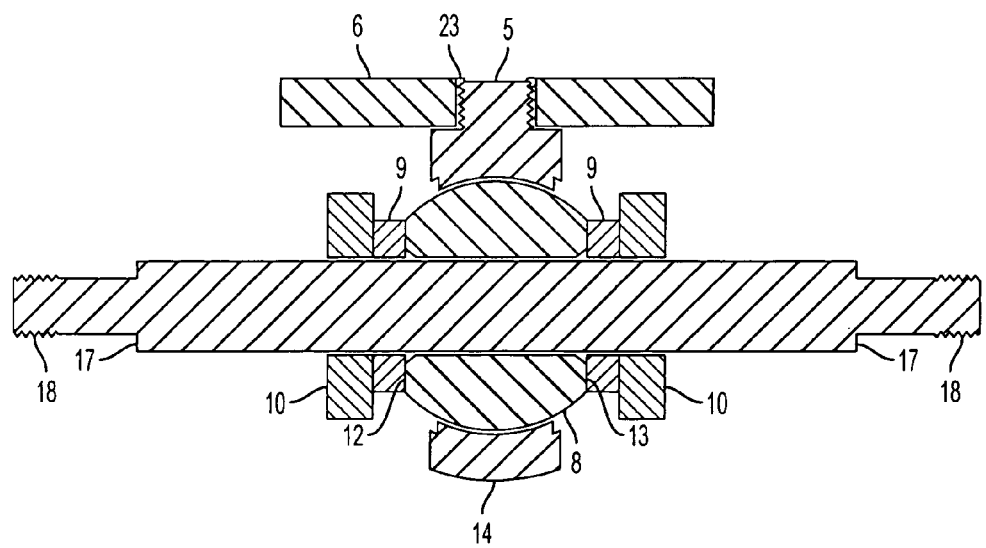
FIG. 12 is a longitudinal cross section view of the ball joint and shaft assembly.
Figure 24:
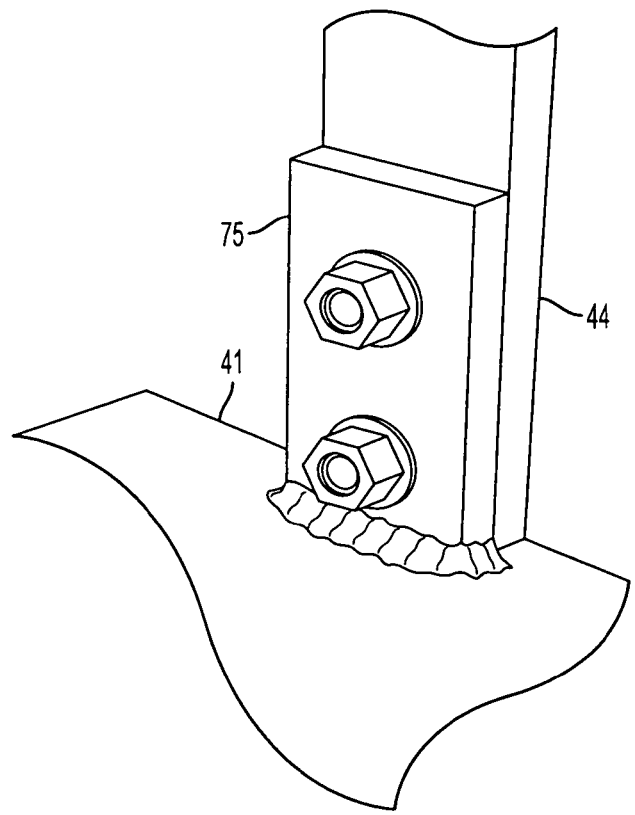
FIG. 24 is a close up perspective view of an alternative upright mounting arrangement.

A support assembly 1 is designed for suspension between a pair of spaced apart mounting points. It has a preferably aluminum equipment mounting element 2 which may be a plate or other shape member, a universal joint assembly such as ball joint assembly 3 and shaft 4. Ball joint assembly 3 comprising a ball 8 mounted within a ring shaped ball race 14 which is oriented vertically and is attached to the underside of the mounting element 2. A stub shaft 5 extending radially from the ball race 14 may be screwed or welded into a hole in the mounting element 2 itself or the stub shaft 5 may be screwed or welded into a hole 23 in a supplemental plate 6 which supplemental plate 6 is attached to the underside of the mounting element 2 as depicted in FIG. 12. Alternatively the ball joint assembly 3 may be welded or otherwise attached directly to the underside of the mounting element 2 or supplemental plate 6. Shaft 4 passes through a bore 7 in the ball 8 of ball joint assembly 3 and protrudes laterally of the ball in opposite directions. The shaft has a close but loose fit so the ball 8 may turn freely about the shaft 4. The ball 8 is retained centrally on the shaft 4 by bearings 9, which are positioned in close proximity or lightly touching the sides of the ball 8, and retaining collars 10 which are positioned in close proximity or lightly touching the bearings 9 and locked to the shaft 4 by suitable means such as set screws 11. The bearings 9 may be made of any common bearing material but are preferably sintered bronze impregnated with oil. The ball joint assembly 3 itself is a commercially available rod end joint with the stub shaft 5 shortened. One example is Model POSB8 pillow ball rod end, insert type, with male thread made by IKO Nippon Thompson Co., Ltd. Ball 8 has centrally located bore 7 and flattened faces 12 and 13 at opposite ends of the bore 7. The ball 8 can rotate in any direction within the ball race 14. The outer ends 15 of the shaft 4 are configured to each connect with an inner end or portion of a suspension member 21. In the preferred embodiment both outer ends 15 are reduced in diameter relative to the center part 16 of the shaft 4 to form shoulders 17. The outermost portions 18 of the reduced diameter outer ends 15 are threaded to receive retaining nuts 19. U-shaped shackles 20 are fitted loosely over the reduced diameter shaft 4 outer ends 15 so they may rotate there about and are retained on the shaft 4 by the nuts 19. Suspension members 21 comprise loops or lengths of strong flexible preferably elastic material such as bungee cord material. The flexibility and elasticity of the material both contribute to vibration isolating properties of the loops. Each loop may be formed by knotting the ends of a short length of elastic material together or by overlapped and binding them together. A piece of shrink wrap tubing 87 may be placed over the knotted or lapped section to reinforce the joint. Alternatively to being of reduced diameter the shaft 4 ends 18 could have bores into which hook or eye bolts could be secured, or elongate suspension cords having hooks on the end could be hooked directly into the shaft end 18 bores. As can be seen in the various figures of the drawings the shaft 4 is located close to the underside of the mounting element 2 to provide a compact support assembly 1. The geometry of the present apparatus, with the universal joint assembly, equipment mounting element and other suspended elements positioned between two laterally spaced mounting points, and the fact that the inner ends of the suspension members and the shaft, universal joint assembly and equipment mounting element are in close vertical proximity to the level of the suspension points, as shown for example in FIG. 3, greatly reduces front to back swinging of the suspended elements, virtually eliminates side to side swinging and thus greatly reduces the pendulum effect vis-a-vis The Aerial Exposures Gyro Stabilized Video and Film Platform where the suspended components are all positioned entirely beneath a single suspension point.

Where suitable mounting points are present on or in a moving platform the opposite ends or portions of the lengths of cord or loops are attached to such mounting points. In most instances the moving platform will not itself have suitable mounting points. To solve this problem the present apparatus may further include a base assembly 40. The base assembly 40 comprises a base plate 41, preferably of aluminum, having suitable tie downs 42 positioned thereon, which may be inverted U shaped members welded to the base plate 41 as shown in FIG. 2, or eye bolts 43 welded, screwed or bolted into the base plate 41 as shown in FIG. 3. Two, preferably steel, uprights 44 may be secured directly to the base, but to provide greater range of movement of a camera are preferably secured to turntable 45 mounted on the base plate 41. The distance between the uprights at their upper ends is greater then the length of shaft 4. The turntable is preferably a flat round piece of steel about 12-14 inches in diameter, though smaller and larger sizes are possible, depending on the overall size of the apparatus desired by the user, the size of other equipment to be used with the apparatus such as the camera and gyros and space and weight limitations of the movable platform on or in which the apparatus will be used. The uprights 44 may be welded to the base plate 41 (not shown) or turntable 45 as shown in FIG. 1, or bolted to upright tabs 75 on the base plate 41 as shown in FIG. 24 or turntable 44 (not shown). When the uprights are bolted to tabs as shown in FIG. 24, by selective removal of the bolts the uprights may be pivoted or removed from the uprights for more compact storage and transportation. The upper ends of the uprights 44 are formed to receive the opposite ends of the suspension members 21. In a preferred arrangement short angled plates 46 are welded to the outside of the uprights 44 a short distance down from the top of the uprights 44. This forms upwardly open V-shaped recesses within which the suspension members 21 may rest. Alternatively a groove could be cut into the uprights 44 from the top down to form a upwardly open slot to receive a portion of looped suspension members or the hook of suspension members formed as hooked lengths of cord. As another alternative a hole could be formed through the uprights 44 to receive the hooked ends of suspension members formed as hooked lengths of cord. The length of the suspension members 21 is such that the shaft is supported at a level in close proximity to the level of the mounting points as depicted in FIG. 3. This also tends to place the center of mass of the suspended support assembly close to the level of the mounting points. This reduces problems associated with the pendulum effect as noted above with respect to applicants earlier apparatus.

Suspension of the support assembly 1 by the resilient cords from the base assembly 40 (or on platform mounting points) isolates the support assembly 1 from vibration in the platform as well as bodily movements of the platform. Rotation of the ball 8 about the shaft 4 and ball race 14 about the ball 8 isolates the mounting element 2 form angular movements of the platform.

Figure 8:
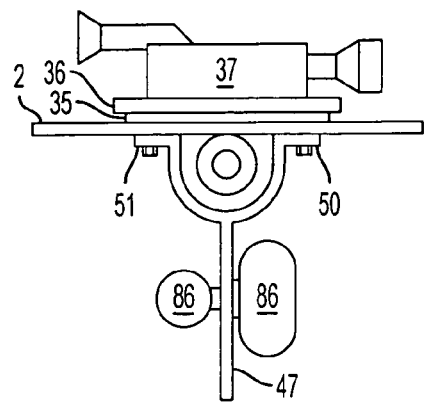
FIGS. 8-10 show schematic side views of alternate gyro positioning arrangements and yro bracket configurations.
Figure 9:
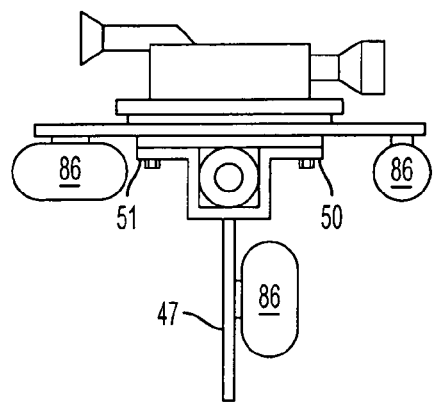
Figure 10:
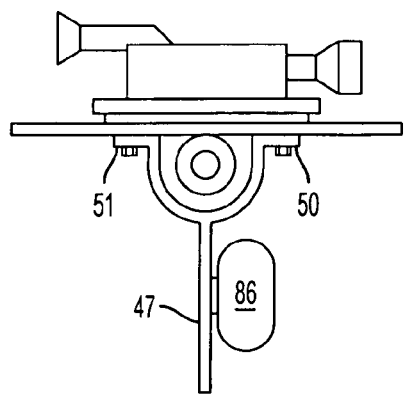
Figure 15:
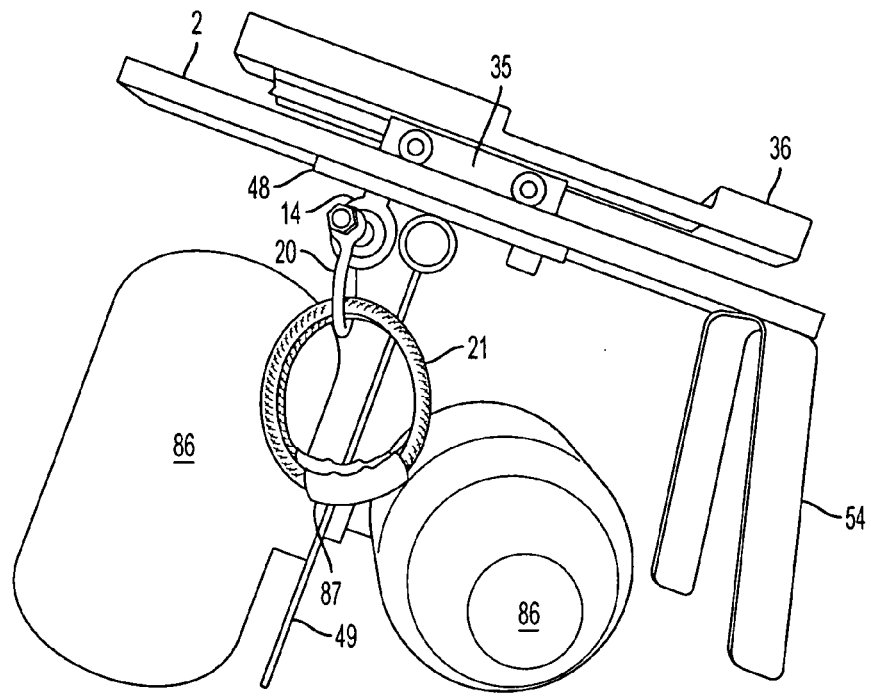
FIG. 15 is a side view of another version support assembly.
Figure 16:
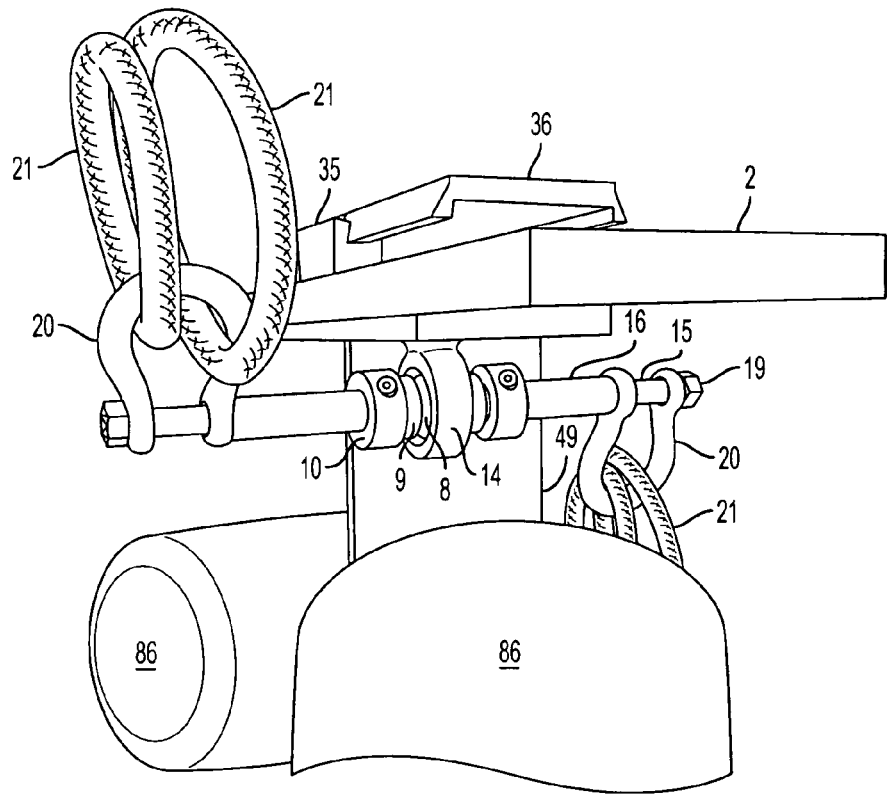
FIG. 16 is a close up perspective view of another version support assembly.
Figure 17:
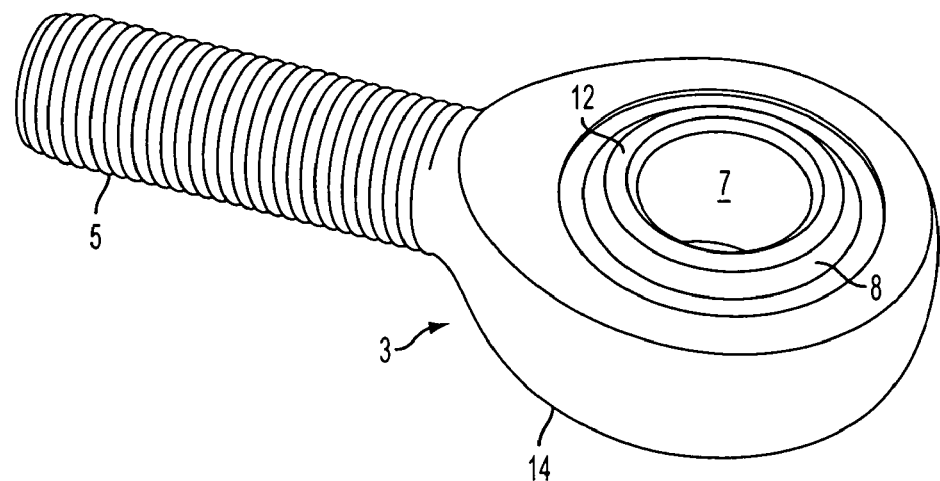
FIG. 17 shows the ball joint rod end assembly.
Figure 18:
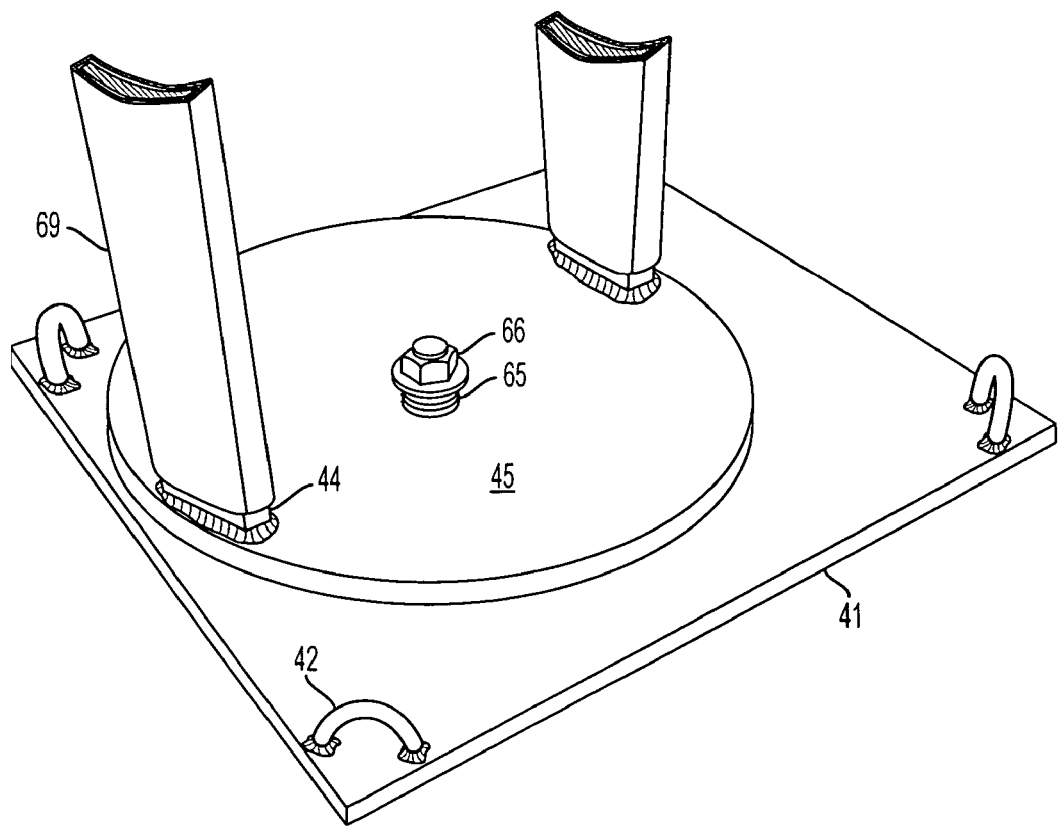
FIG. 18 shows a close up perspective view of the base/turntable assembly
Figure 19:
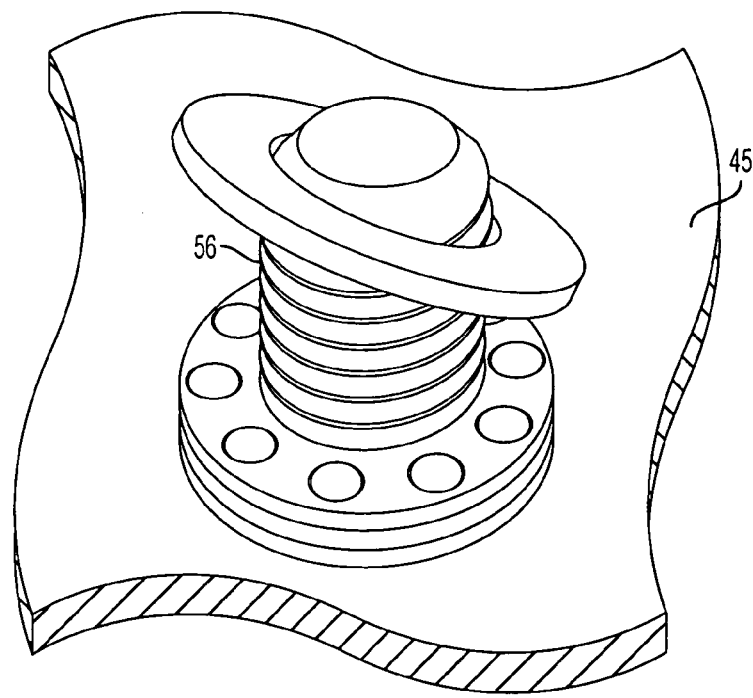
FIG. 19 shows a close up perspective view of the turntable upper ball bearing assembly
Figure 20:
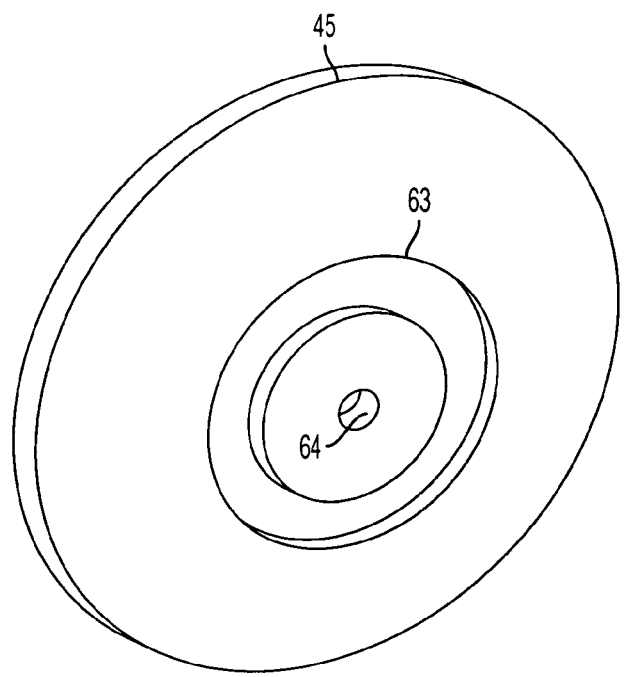
FIG. 20 is a perspective view of the underside of the turntable.
Figure 21:
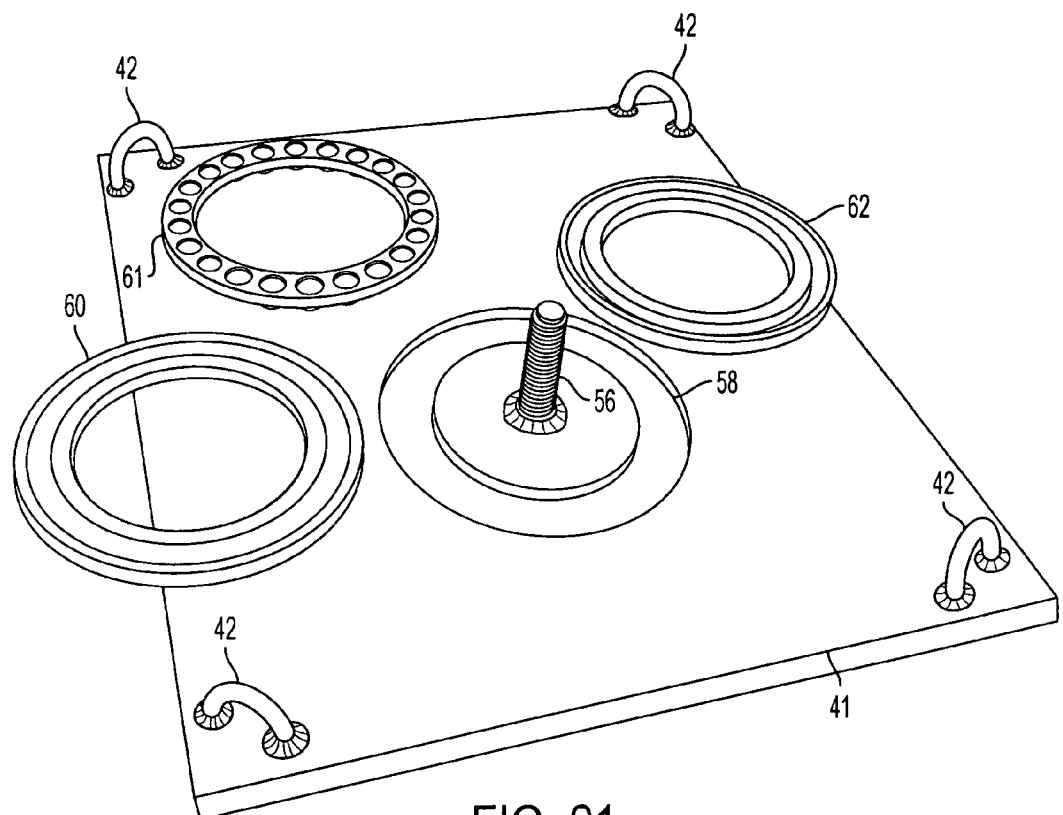
FIG. 21 is a perspective view of the base and turntable lower ball bearing assembly components.
Figure 22:
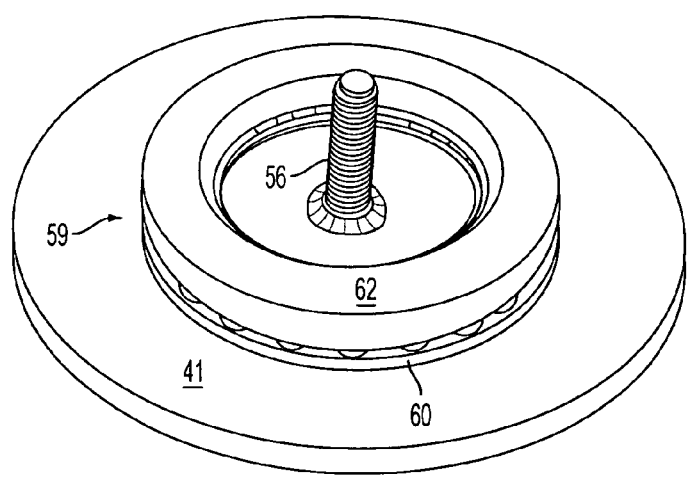
FIG. 22 shows the prototype turntable lower ball bearing assembly assembled on the base.
Figure 23:
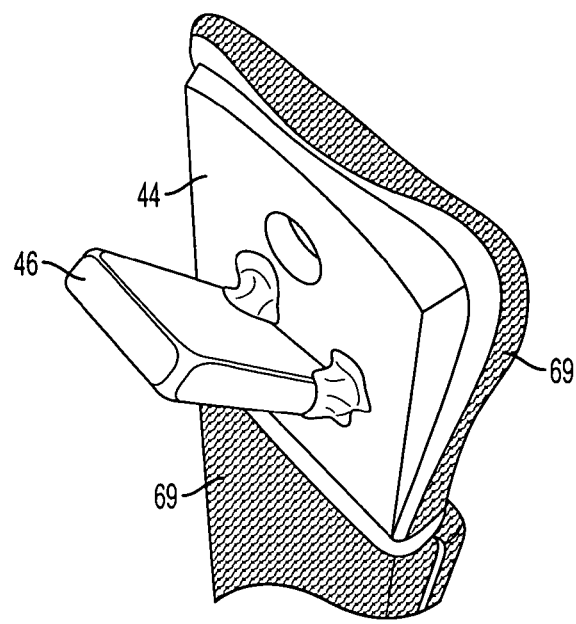
FIG. 23 is close up perspective view of the prototype upright upper end.

For even greater stability of the mounting element 2 gyroscopic stabilizers 86 may be mounted under the mounting element 2. This may be achieved in various ways. As shown in FIG. 9 gyros 86 may be mounted directly to the underside of the mounting element 2, for example by bolts threaded into holes in the mounting element 2. For balance one gyro 86 is mounted under the front of the plate and another under the back of the plate. These gyros 86 may also be mounted indirectly to the underside of the mounting element 2 by suitable spacer brackets such as C shaped or box shaped brackets. Additionally or alternatively gyros 86 may be mounted to a central gyro mounting bracket 47. In one embodiment, shown in FIG. 15, the central gyro mounting bracket 47 is T-shaped and bolted to the underside of the mounting element 2 with the ball race 14 welded to the underside of the cross member 48 forming the top of the T with the vertical leg 49 of the T positioned under the longitudinal center area of the mounting element 2. In preferred embodiments the upper end of the central gyro mounting bracket 47 is U, V or open box shaped and surrounds the ball race 14 as shown in FIGS. 8-10. The upper ends of the legs of the U, V or box shape have forwardly and rearwardly extending flanges 50, 51 to facilitate bolting the central gyro bracket 47 to the underside of the mounting element 2. As shown in FIGS. 8 and 10 the ball race 14 is attached directly to the mounting element 2 and the flanges 50, 51 are bolted in contact with the underside of the mounting element 2. In FIG. 9, the supplemental plate 6 is sandwiched between central gyro bracket flanges 50, 51 and mounting element 2 whereby the supplemental plate 6 and central gyro bracket 47 are secured to the mounting element 2 by the same bolts. The vertical leg 49 of the central gyro bracket 47 has a vertical row of holes 52 for mounting the gyros 86 at varying distance from the mounting element 2 to adjust the balance of the apparatus and compensate for different weight gyros 86 and devices mounted on and above the mounting element 2. As can be seen in FIG. 8 the gyros 86 may be mounted to the front or back of the vertical leg 49 of the central gyro bracket 47. As shown in FIG. 3 a supplemental bracket 53 may be attached to the vertical leg 49 of the central gyro bracket 47 to accommodate two gyros 86 side by side instead of front to back. A similar supplemental bracket (not shown) could be used on the underside of the mounting element 2 for mounting gyros 86 side by side.

Figure 11:
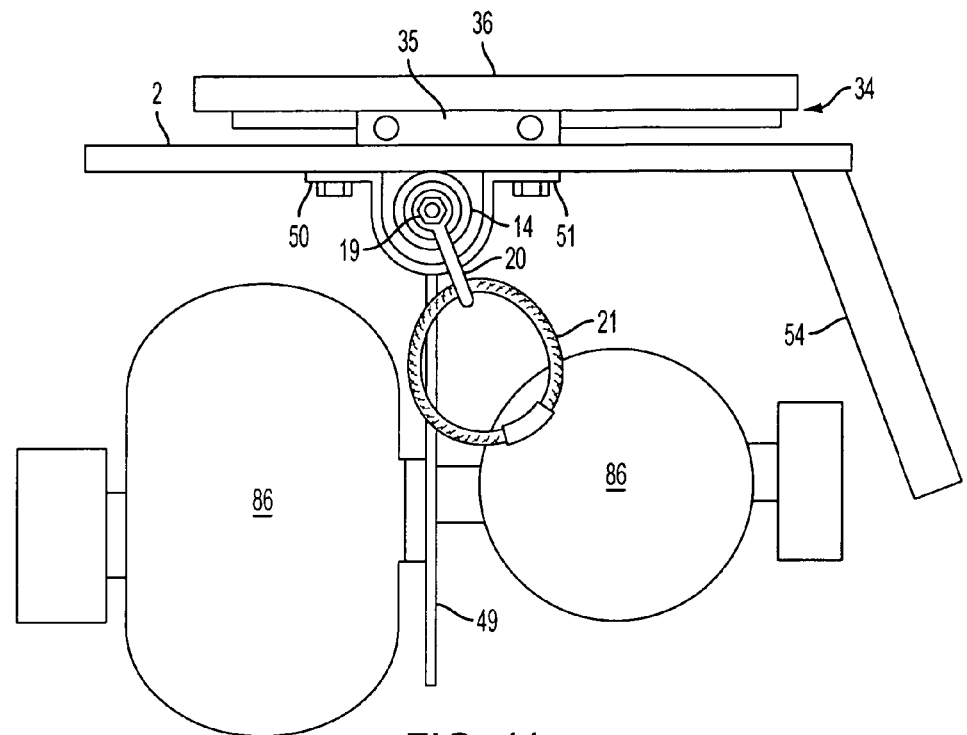
FIG. 11 is a side view of the support assembly.
Figure 14:
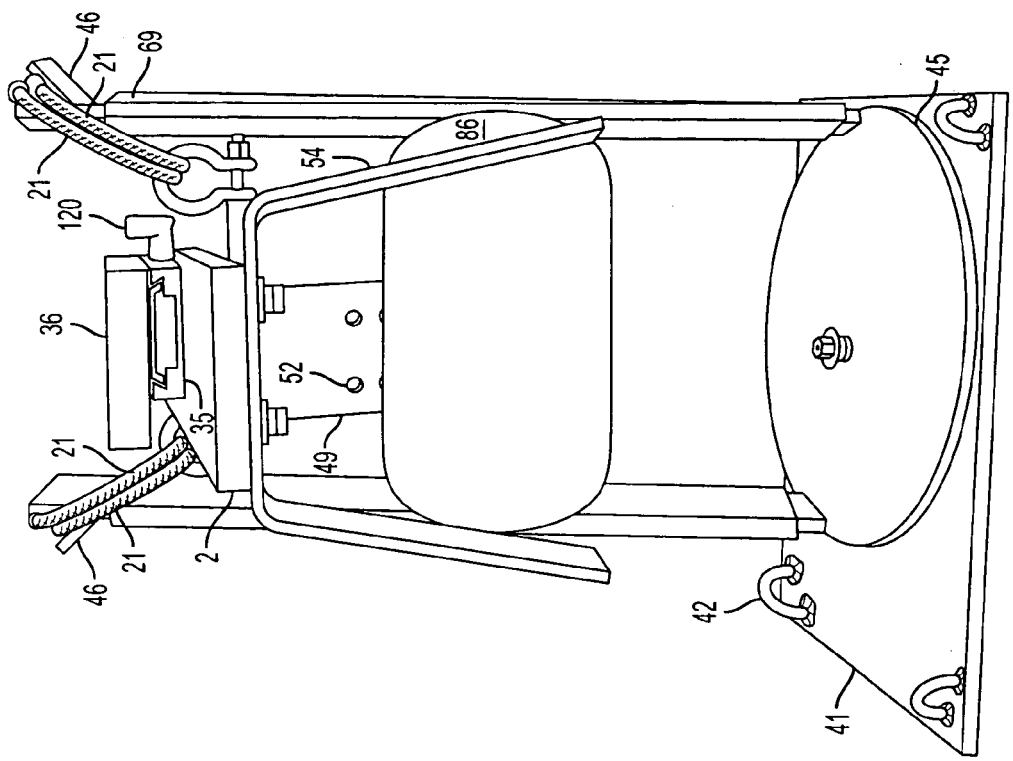
FIG. 14 is a rear view of another version of the platform assembly.
Figure 13:
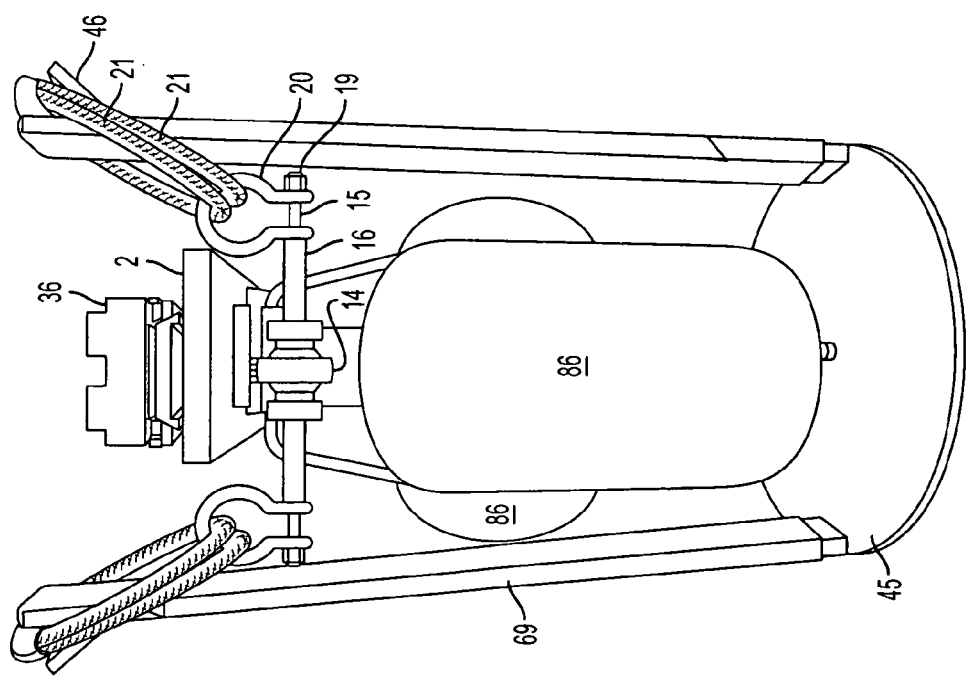
FIG. 13 is a front view of another version of the platform assembly.

As seen if FIGS. 1, 11 and 14 a pair of handles 54 may be attached to the rear of the mounting bracket to facilitate manipulating the aim of any device on the mounting element 2. In the preferred embodiment this takes the form of an inverted truncated V shaped member 55 bolted to the underside of the mounting element 2.

The turntable 45 is mounted to the base by a stud and nut assembly. The base plate 41 is formed with an upwardly facing ring shaped recess 58. At the center of the ring a stud 56 is welded to the base plate 41. The lower race 60 of a ball bearing assembly 59 is positioned in the base plate 41 recess 58. A ball bearing ring 61 sits on the lower race 60. An upper race 62 is positioned above the ball bearing ring 61. The turntable 45 fits over the upper race 62. The underside of the turntable 45 has a mating recess 63 to receive the upper race 62 and a bore 64 in its center through which the stud 56 extends. A second ball bearing assembly 65 fits around the stud and rests on the top of the turntable 45. A nut 66 on the upper end of the stud holds the entire assembly together. Instead of a stud and nut the base plate 41 could have a threaded hole 67 at the center of the recess 58 and a bolt 68 could extend from above through the upper ball bearing assembly 65, turntable 45 and into the threaded hole 67 as shown in FIG. 1.

For added safety the uprights 44 could be covered with suitable padding 69.

Figure 7:
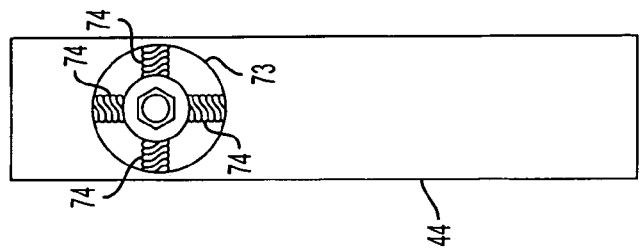
FIG. 7 shows a partial side view of a second alternate support assembly to base mounting ent.
Figure 6:
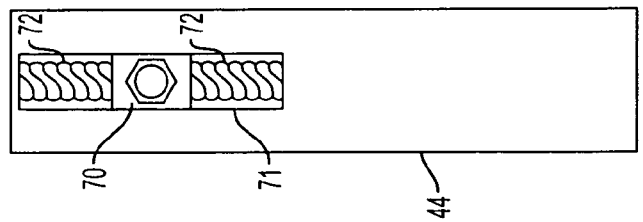
FIG. 6 shows a partial side view of the alternate support assembly to base mounting ment of FIG. 5.
Figure 5:
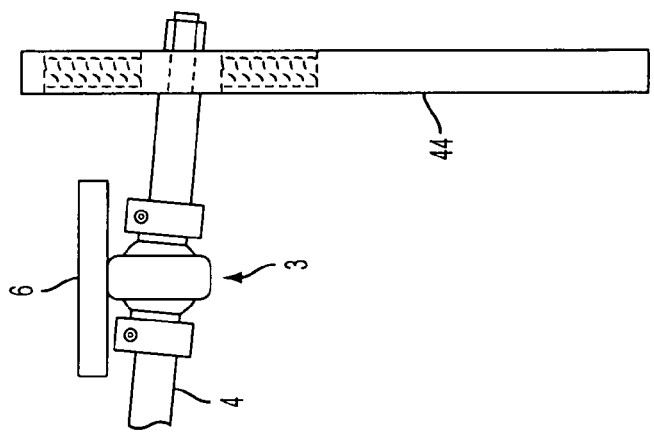
FIG. 5 shows a partial front view of an alternate support assembly to base mounting ent.
Figure 4:
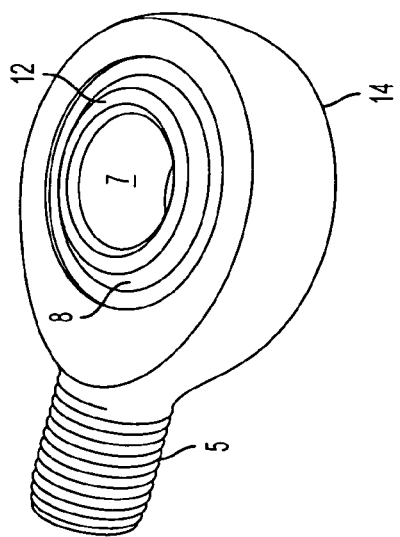
FIG. 4 shows the rod end assembly with shortened shank.

Instead of suspending the shaft 4 from resilient cords the ends of the shaft 4 could be mounted in blocks 70 slidably mounted to the uprights 44 such as in vertical slots 71. The blocks 70 themselves could be made of a material which would provide some isolation of the shaft 4 from vibration and a limited amount of horizontal displacement of the movable platform. Springs 72 or resilient fillers in the slots above and below the block would suspend the blocks in the slot and provide substantial vertical displacement isolation. This arrangement is shown in FIGS. 5 and 6. In another variant, FIG. 7, the blocks could be suspended within suitably shaped, such as circular, openings 73 in the uprights 44 and held by three or more radially equally spaced resilient members 74. A surrounding resilient ring to provide more universal isolation could be substituted for the radially spaced springs or resilient members 74. These arrangements position the shaft ends at the same level as the mounting points, allow little or no swinging movement of the suspended elements and virtually eliminate pendulum effects.

A mount(s) is/are provided for mounting a camera 37 or device pointing forwardly on the mounting element 2. This may take the form of appropriate mounting holes in the plate itself or any well known quick release mount 34. Quick release mounts in general include two plates 35, 36 with mating configurations and a latch arrangement which allow the two plates to pivot and lock, slide and lock or twist and lock together yet easily release by operation of a detent, button, lever or the like. See for example U.S. Pat. No. 5,108,216 (pivot and lock) U.S. Pat. No. 4,570,951 (slide and lock) and U.S. Pat. No. 4,763,151 (slide and lock) the disclosures of which are incorporated herein by reference. The base plate 35 of quick release 34 is fastened to the top of mounting element 2 by suitable means such as bolts, screws, bonding, welding or the like. A camera 37 or other accessory is similarly attached to the camera mounting plate 36 of quick release 34. A suitable commercially available quick release is the Manfrotto Universal Sliding Plate, available through Bogen Photo Corp., whose web address is www.bogenphoto.com, as their Cat. No. 3273. This quick release has a base plate 35 formed with a dovetail groove within which slides the camera mounting plate 36 which is formed as a mating dovetail tongue, and a latching arrangement 120 to lock the base plate and camera mounting plate against relative movement. By integrating longitudinal adjustment between the base plate 35 and camera mounting plate 36 as well as quick release functions in a single mount it becomes easy to interchange cameras and adjust their position relative to the support assembly 1 to help balance the assembly. Separate single function mounts, such as the Manfrotto Micro positioning plate, Bogen Cat. No. 3419, and Stroboframe Auto Quick Release Model 300-QRC, available through B&H Photo, 420 Ninth Ave., New York, N.Y. 10001, whose web address is www.bhphotovideo.com, could also be used, either separately or combined depending on the functionality desired. FIGS. 26-28 show an improved positioning arrangement. Mounting element 2 is provided along most of its length with a pair of spaced parallel dovetail rails 121 and 122. Located between the rails and extending parallel thereto is a rack gear 123. A preferably aluminum bridge plate 124 has a dovetail groove 125 on its underside formed by bridge portion 126 and spaced parallel side portions 127 and 128. At one end the groove the side portions are tapered slightly 129 to facilitate positioning the bridge plate 124 over the dovetail rails 121, 122. At the other end of the groove 125 is a pinion gear 130 mounted on a shaft 131 extending across the groove and through the side portions 127, 128 of the bridge plate 124. Manipulating members 132, such as knobs, are mounted on the protruding ends of the shaft 131. One of the knobs 132 could be of larger diameter than the other. A locking member 133 of acetal homopolymer resin, such as E. I. du Pont de Nemours and Company Delrin® brand resin, nylon or equivalent material is slidably mounted in one of the side portions of the bridge plate to extend slightly into the dovetail groove 125. A set screw 134 with a manipulating member 135, such as a knob, is screwed into the same side of the bridge plate and bears against the nylon insert. A longitudinal groove 136 in the center of the bridge portion of the bridge plate provides a location where one or more fasteners 137, such as screws, may be used to attach the bridge plate to the underside of a camera or an intervening element such as a quick release assembly. With the bridge plate 124 positioned over the dovetail rails 121, 122 on the mounting element 2 the pinion gear 130 engages the rack gear 123. By rotating either of members 132 the bridge plate will travel along the length of the mounting plate and permit the longitudinal position of the camera to be varied to assist in balancing the entire assembly. The smaller diameter knob would provide relatively rapid adjustment while the larger diameter knob would allow finer but slower adjustment. Tightening the set screw 134 by manipulating member 135 presses the locking member against the face of one of the dovetail rails to lock the bridge plate and camera in the desired position. Applicants design allows a greater range of adjustment than the commercial arrangements known to him and facilitates easy and precise adjustment of the longitudinal position of a camera mounted on the apparatus.

Preferably the invention is used with gyros 86 each of which is constructed to resist rotation about two perpendicular axes. Such gyros are commercially available as the Kenyon Gyro Stabilizer Model Admiral KS-8 by Kenyon Laboratories of Essex, Connecticut and whose web address is http://www.ken-lab.com. Larger and smaller size gyros available from Kenyon, and gyros from other manufacturers, are also usable.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. Apparatus to facilitate stably supporting a camera or other device relative to a moving and/or vibrating platform, said apparatus comprising:
    a base;
    a pair of spaced apart uprights extending upwardly from the base; and
    a support assembly suspended between said uprights, said support assembly comprising;
        a universal joint assembly comprising a ring race and a ball mounted in the race, and
        an equipment mounting element secured to a portion of and above the universal joint assembly.

2. The apparatus of claim 1 wherein the ring race is generally vertically oriented, the ball has a generally horizontal bore extending laterally there through and generally perpendicular to the vertical orientation of the ring race, and a shaft is positioned through the bore.

3. The apparatus of claim 2 further comprising at least one suspension member engaged with and extending between each of the uprights and a portion of the shaft on opposite sides of the ball.

4. The apparatus of claim 3 wherein each suspension member comprises elastic material.

5. The apparatus of claim 4 wherein the suspension member is engaged with the upright at a first level and is a length to suspend the shaft at a second level the same as or in close proximity below the first level to minimize the pendulum effect.

6. Apparatus to facilitate stably supporting a camera or other device relative to a moving and/or vibrating platform, said apparatus comprising:
    a base;
    a pair of spaced apart uprights extending upwardly from the base; and
    a support assembly suspended between said uprights, said support assembly comprising;
        a universal joint assembly; and
        an equipment mounting element secured to a portion of and above the universal joint assembly,
    wherein the base comprises a turntable rotatably mounted thereon and the uprights are mounted to the turntable.

7. Apparatus to facilitate stably supporting a camera or other device relative to a moving and/or vibrating platform, said apparatus comprising:
    a base;
    a pair of spaced apart uprights extending upwardly from the base; and
    a support assembly suspended between said uprights, said support assembly comprising;
        a universal joint assembly;
        an equipment mounting element secured to a portion of and above the universal joint assembly; and
        means for mounting stabilizing means to the equipment mounting element.

8. The apparatus of claim 7 wherein the means for mounting stabilizing means to the equipment mounting element comprises a bracket extending generally vertically beneath the equipment mounting element and extending at least partially below the universal joint assembly.

9. The apparatus of claim 8 further comprising stabilizing means attached to at least one of the equipment mounting element and bracket.

10. Apparatus to facilitate stably supporting a camera or other device relative to a moving and/or vibrating platform, said apparatus comprising:
    a ball and socket universal joint assembly;
    an equipment mounting element secured to a portion of and above the universal joint assembly; and
    means for suspending the universal joint assembly between two spaced mounting points.

11. The apparatus of claim 10 wherein the ball and socket universal joint assembly comprises a ring race and a ball mounted in the race.

12. The apparatus of claim 11 wherein the ring race is generally vertically oriented, the ball has a generally horizontal bore extending laterally there through and generally perpendicular to the vertical orientation of the ring race, and a shaft is positioned through the bore.

13. The apparatus of claim 12 wherein the means for suspending the universal joint assembly comprises elastic material.

14. The apparatus of claim 13 wherein the elastic material is attached to the shaft.

15. The apparatus of claim 10 wherein the means for suspending the universal joint assembly between two spaced mounting points comprises a base, a pair of spaced apart uprights extending upwardly form the base and having portions defining the two spaced mounting points and elastic material connected between the two spaced mounting points and the universal joint assembly.

16. The apparatus of claim 10 further comprising a stabilizing means mounting bracket extending generally vertically beneath the equipment mounting element, the bracket having an upper portion attached to the equipment mounting element and surrounding the universal joint assembly, and a lower portion extending below the universal joint assembly.

17. Apparatus to facilitate stably supporting a camera or other device relative to a moving and/or vibrating platform, said apparatus comprising:
    abase;
    a turntable mounted on said base;
    a pair of spaced apart uprights extending upwardly from the turntable;
    a universal joint assembly comprising a ball race, a ball mounted in the ball race and a shaft extending through the ball, the shaft having opposite end portions protruding from diametrically opposite locations of the ball, each of the end portions extending towards one of the uprights;
    an equipment mounting element secured to the ball race and positioned above the universal joint assembly; and
    an elastic member extending between each upright and the adjacent shaft end portion of the universal joint assembly.

18. The apparatus of claim 17 further comprising means for mounting stabilizing means to the equipment mounting element.

19. The apparatus of claim 18 further comprising stabilizing means attached to the equipment mounting element.

* * * * *